United States Patent [19]

Hasan

[11] Patent Number: 5,724,658
[45] Date of Patent: Mar. 3, 1998

[54] CALL ROUTING TO WIRELESS ROAMERS IN MOBILE TELECOMMUNICATION SYSTEMS

[75] Inventor: S. Kamran Hasan, Dallas, Tex.

[73] Assignee: MCI Communications Corporation, Washington, D.C.

[21] Appl. No.: 517,119

[22] Filed: Aug. 21, 1995

[51] Int. Cl.[6] .................................. H04Q 7/22; H04Q 7/24
[52] U.S. Cl. ........................... 455/445; 455/432; 455/433; 455/436; 455/439
[58] Field of Search .................................. 379/58, 59, 60; 455/33.1, 33.2, 432, 433, 435, 436, 438, 439, 445, 463

[56] References Cited

U.S. PATENT DOCUMENTS

| | | | |
|---|---|---|---|
| 4,833,701 | 5/1989 | Comroe et al. | 379/60 |
| 4,899,373 | 2/1990 | Lee et al. | |
| 5,159,625 | 10/1992 | Zicker. | |
| 5,311,570 | 5/1994 | Grimes et al. | 379/57 |
| 5,345,498 | 9/1994 | Mauger. | |
| 5,353,331 | 10/1994 | Emery et al. | 379/58 |
| 5,371,782 | 12/1994 | Casey, III et al. | |
| 5,526,400 | 6/1996 | Nguyen | 379/59 |

Primary Examiner—Dwayne Bost
Assistant Examiner—Nay Maung

[57] ABSTRACT

A method of serving a roaming subscriber in a telecommunication system having at least one wireless service carrier that can communicate with the roaming subscriber. A wired exchange carrier can communicate with the wireless service carrier and has access to a long distance trunk. A call destined for the roaming subscriber is received at the wired exchange carrier via the long distance trunk, and includes both a routing number corresponding to the roaming address of the roaming subscriber and a call routing parameter corresponding to the wireless service carrier. The call is selectively sent to the wireless service carrier in response to the call routing parameter, and a communication channel between the wireless service carrier and the roaming subscriber is then established in response to the routing number. The identity of the wireless service carrier may be provided to a register, and the call routing parameter may be included at this register, or optionally at an intermediate carrier having a communication link with this register.

19 Claims, 4 Drawing Sheets

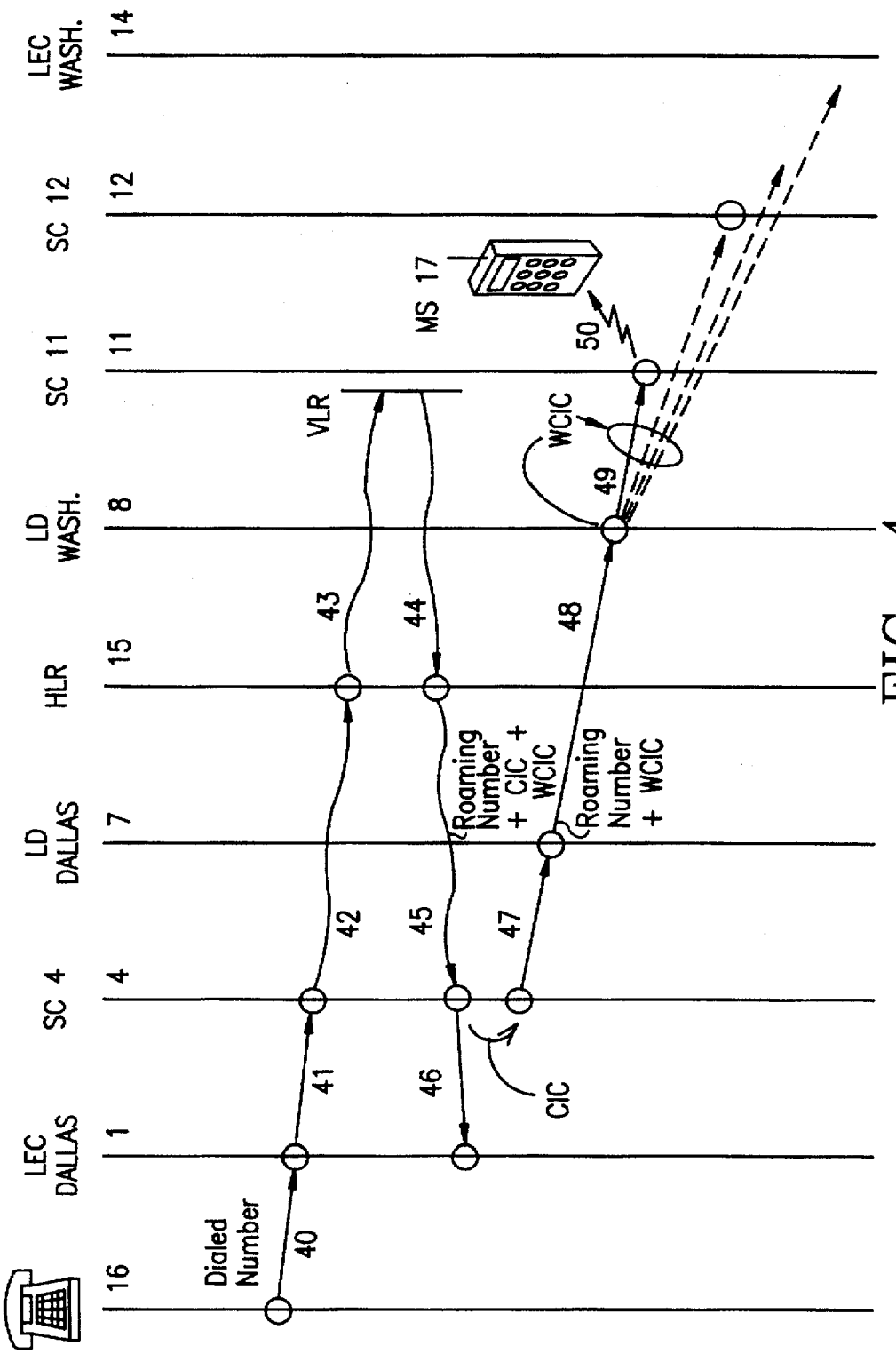

CALL ROUTING TO WIRELESS ROAMERS IN MOBILE TELECOMMUNICATION SYSTEMS

FIELD OF THE INVENTION

The present invention relates to mobile telecommunication systems, and particularly to mobile telecommunication systems designed to efficiently handle a subscriber roaming outside of the home geographic area.

BACKGROUND OF THE INVENTION

Mobile telecommunication systems enable subscribers to communicate through wireless links from a plurality of geographic locations. For local subscribers, access to the wireless network is generally provided in only a relatively small geographic area, which can be covered by a small number of wireless base stations using possibly a single wireless service carrier. A call is initiated through a local wireless base station linked to a VLR (visitor location register), which temporarily stores subscriber profile information, or is linked directly to the subscriber's HLR (home location register) containing the complete and relatively permanent subscriber information. As the subscriber moves from one location to another within the same local carrier service area, the serving base station and/or the VLR may change, but generally the subscriber may be reached with the same telephone number.

The present invention is concerned with the case where the subscriber travels a far distance from the local service area to a remote location that cannot be reached with the same telephone number. This case is referred to in the mobile communication field as "roaming." For example, the subscriber may be originally serviced by a Dallas (local) wireless service carrier. If the subscriber travels ("roams") to the Washington service area, the wireless communication network needs to be informed of the change in location so that future calls to the subscriber will be properly transferred to a Washington (remote) wireless service carrier.

In the past, this was done by the Washington LEC (local exchange carrier) reserving and assigning a block of Washington telephone numbers to each wireless telephone service carrier in the Washington area, so that each remote wireless carrier could temporarily assign one of its reserved numbers to a roaming subscriber visiting the Washington area. In one such prior method, the assigned telephone number is also communicated to the roaming subscriber's profile information record in the corresponding Home Location Register (HLR), so that the interconnecting networks will know how to contact the roaming subscriber. If blocking is to be avoided, such a system requires that the remote LEC maintain a reserved inventory of telephone numbers with sufficient quantities of numbers to be able to accommodate all remote wireless carriers and their roaming subscribers.

As a variation of the foregoing prior method, the block of temporary telephone numbers assigned to a specific remote wireless carrier may be maintained in a pool at the corresponding remote VLR, and then temporarily assigned to a roaming subscriber only during the time that a call is in progress. Thus, a smaller block of temporary telephone numbers is needed to service a larger number of roaming subscribers. Although either of these prior methods enables existing telecommunication networks to handle communication by roaming subscribers, such systems are complicated to manage, and are inefficient in that they tie up valuable telephone numbers that could be used for other purposes, such as being assigned to full-time resident subscribers.

SUMMARY OF THE INVENTION

Therefore, the present invention provides a method and apparatus for accommodating telephone calls from or to roaming subscribers without requiring a distinct inventory of special telephone numbers for each wireless service carrier. Moreover, the invention enables multiple wireless service carriers to simultaneously use the same inventory of telephone numbers, thereby relieving the demand for new telephone numbers that would otherwise occur with the rapidly increasing demand for wireless services. Furthermore, the invention enables roaming service to be carried out with only minor modifications to the present mobile communication network.

In its simplest form, the present invention comprises a relatively small quantity of reserved telephone numbers that are assigned to and maintained in a pool at a remote wireless service carrier, and that are then temporarily assigned to roaming subscribers during a telephone call. The same telephone numbers are also assigned to all other remote wireless service carriers in the same geographic region. An additional message parameter, preferably called a Wireless Carrier Identification Code (WCIC), is used during call routing to indicate which remote wireless service carrier should receive the telephone call. The call may be routed either through the remote LEC, or a direct link may be established between the interexchange (long distance) carrier and each remote wireless service carrier to further enhance switching speed.

BRIEF DESCRIPTION OF THE DRAWINGS

The features of the invention and its objects and advantages may be further understood from the detailed description below taken in conjunction with the accompanying drawings, in which.

DETAILED DESCRIPTION OF THE PREFERRED EMBODIMENT

Since the present invention is especially useful to facilitate calls made to mobile subscribers (i.e., incoming calls), the discussion which follows will focus on that process. A similar discussion would apply for calls made by the mobile subscriber. Furthermore, the term "call" encompasses transmission of voice and/or data information, whether analog or digital. This information can be unidirectional or bidirectional in nature. Therefore, a typical call connection is not necessarily required if data information is to be sent utilizing the routing and addressing mechanisms of the invention with packet switching or similar technologies.

Figure 1:
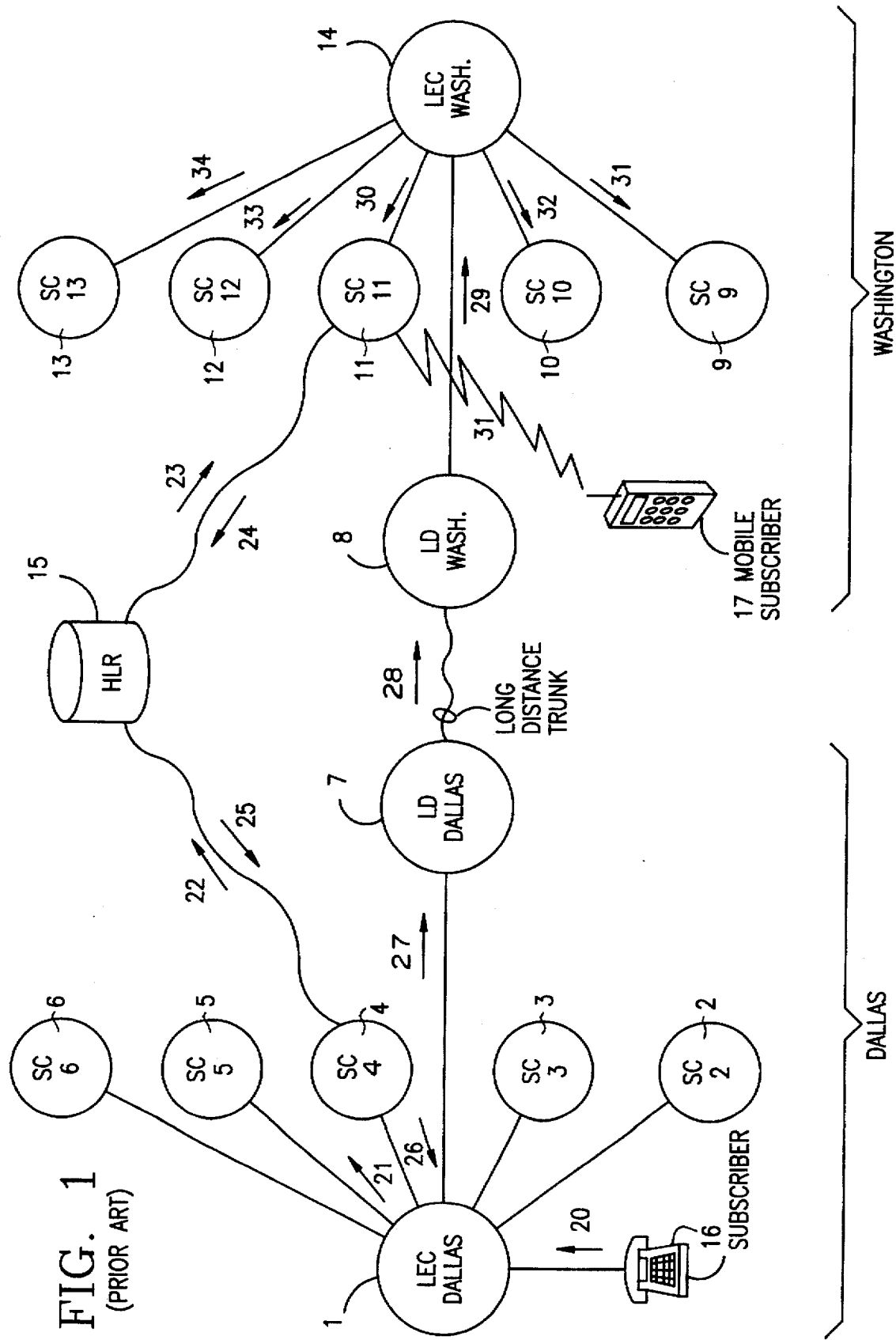
FIG. 1 is a diagrammatic illustration of a conventional telecommunication network and indicates the flow of communication in establishing a call from a local wired subscriber to a remote roaming subscriber.

FIG. 1 shows two widely separated geographic areas (Dallas, on the left, and Washington on the right), each containing a plurality of wireless service carriers (SC's). SC's 2–6 and 9–13 are linked respectively through local and remote Local Exchange Carriers (LEC's) 1 and 14 to a long distance (LD) carrier's trunk line having local and remote terminal points 7 and 8, respectively. The LEC's 1 and 14 also provide the primary communication link for the individual wired subscribers (e.g., subscriber 16) in addition to the wireless subscribers (e.g., mobile subscriber 17), the latter passing through one of the SC's 2-6 and 9-13.

Normally, mobile subscriber 17 lives in the Dallas area and communicates with the telecommunication network through SC 4, and therefore has a permanently assigned telephone number that is unique throughout the telecommunication network. This permanently assigned telephone number is also registered in the subscriber's profile in Home Location Register (HLR) 15, which also includes information relating to the current location of the subscriber and other pertinent data. The HLR is linked to all facilities of the same wireless service carrier so that it may update the subscriber information and be queried in response to incoming and outgoing calls between a mobile subscriber and the communication network.

In the conventional calling process, as further illustrated in FIG. 1, another subscriber 16 (this time shown as a wired subscriber) initiates a telephone call by dialing the telephone number of the desired mobile subscriber (MS) 17. When MS 17 is located in the Dallas area (not shown), the call would proceed from subscriber 16 through LEC 1 and SC 4 to MS 17. However, before the call can proceed from SC 4 to MS 17, SC 4 must first determine that MS 17 is present in the Dallas area. This is accomplished by checking the corresponding subscriber information in HLR 15, or by checking an entry in a visitor location register (VLR) located in close communication with SC 4 and containing a subset of the information contained in the HLR. When MS 17 roams to another geographic area, such as the Washington area, it first registers with its service provider in that area by communicating with SC 11, which in turn communicates with the HLR 15 for the purpose of updating the subscriber's current location entry. However, because MS 17 is no longer located in the Dallas area, it must temporarily receive a new telephone number corresponding to its current location in Washington. For this purpose, in the conventional telecommunication system, a block of available telephone numbers are assigned by Washington LEC 14 to SC 11 for the purpose of being loaned to roaming subscribers while they are visiting SC 11. Thus, SC 11 selects an unused number from the available block of numbers and assigns it to MS 17. In one prior method, MS 17 is then registered in the HLR 15 with this temporary remote telephone number. HLR 15 also updates any VLR's such as the VLR associated with SC 4 to reflect the fact that MS 17 is no longer present in Dallas, and updates the VLR associated with SC 11 to indicate that MS 17 is present in Washington.

In another prior method, SC 11 maintains the available telephone numbers in a pool and one of these numbers is assigned to MS 17 only while a telephone call is in progress. Thus, a temporary remote telephone number is not registered with the HLR during the entire time that the subscriber is roaming in Washington; but instead, the HLR queries the VLR associated with SC 11 to obtain a temporary telephone number only while a call is being processed.

As mentioned above, the present invention is concerned primarily with facilitating the transmission of telephone calls to mobile subscribers such as MS 17. What follows is a more detailed discussion of the process of transmitting and receiving a telephone call in the prior methods (FIGS. 1 and 2), and in the preferred embodiment of the present invention (FIGS. 3 and 4). The various communication resources illustrated schematically in FIGS. 1 and 3 correspond to the vertical lines in FIGS. 2 and 4, respectively, and the numbering is the same in all of the figures.

Figure 2:
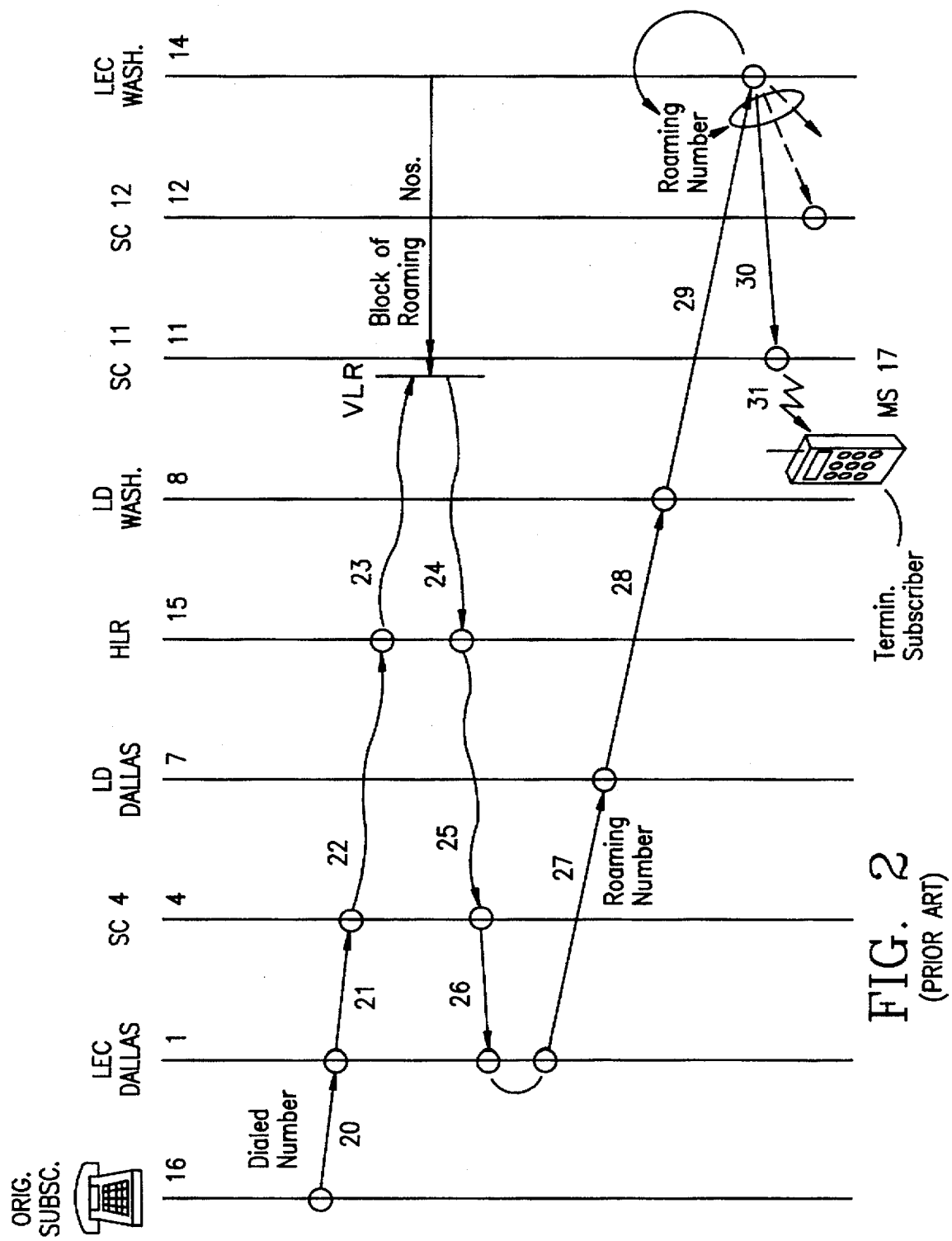
FIG. 2 is a schematic illustration of the communication signals corresponding to the network of FIG. 1.
Figure 3:
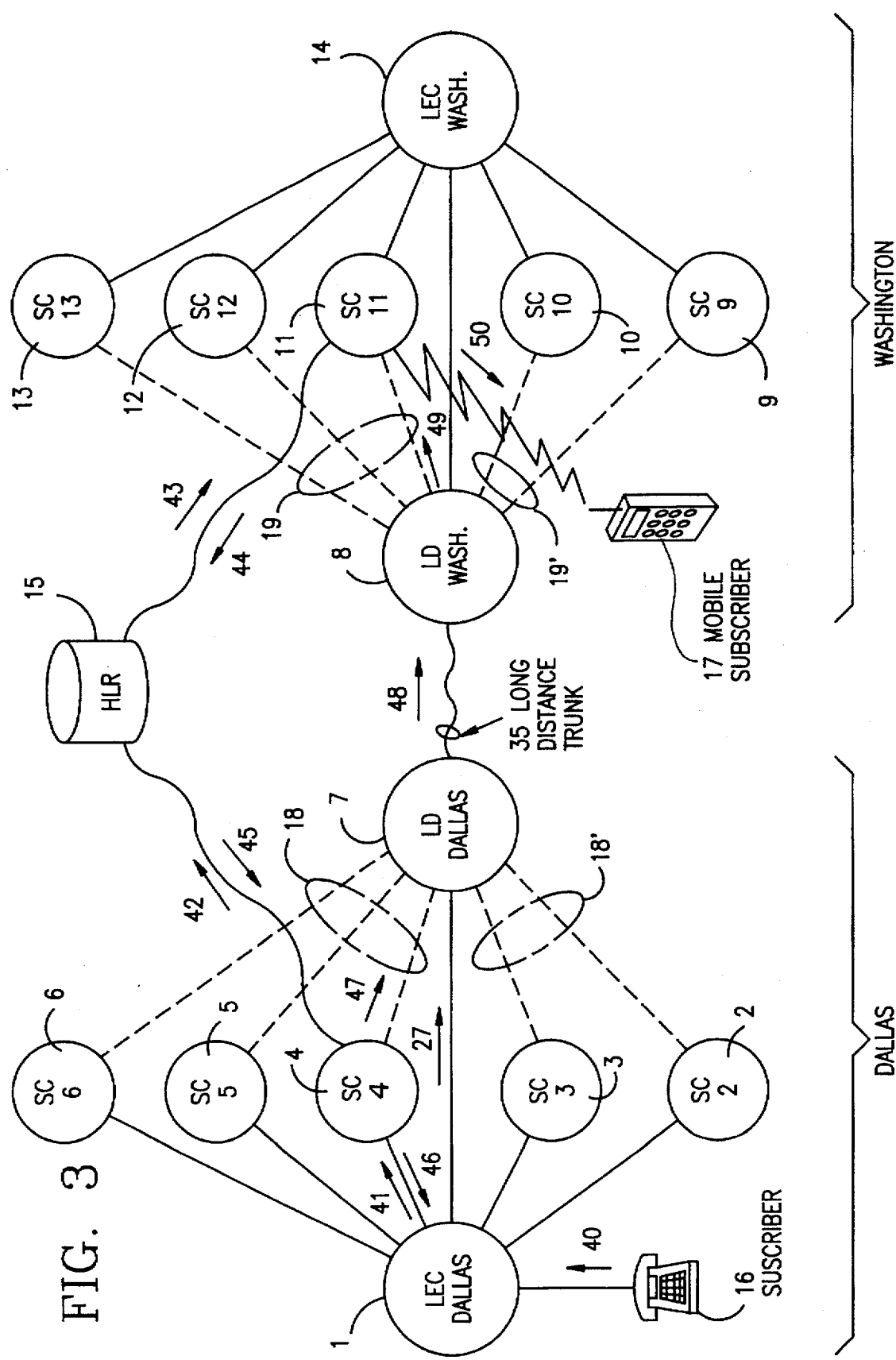
FIG. 3 is a diagrammatic illustration of a telecommunication network in accordance with the preferred embodiment of the invention, and indicates the flow of communication in establishing a call from a local wired subscriber to a remote roaming subscriber; and, FIG. 4 is a schematic illustration of the communication signals corresponding to the network of FIG. 3.

In the conventional system, as shown by the signal diagram of FIG. 2 and in the schematic resource diagram of FIG. 1, the originating subscriber dials the telephone number for MS 17 via path 20. In this case, the telephone number dialed is the permanent telephone number for MS 17 (regardless of the fact that MS 17 may have adopted a temporary number while roaming). LEC 1 receives the dialed number, and sends it to SC 4 via path 21, which contacts HLR 15 via path 22 to determine the current telephone number for MS 17.

HLR 15 may return the current telephone number directly (not shown) in the case where a roaming telephone number is assigned to MS 17 during the entire time it is roaming in the Washington area, or HLR 15 may first query the VLR associated with SC 11 via paths 23 and 24 to obtain a roaming number newly assigned only for this telephone call from the currently available roaming number pool. HLR 15 returns the roaming telephone number for MS 17 along with a carrier identification code (CIC) indicating the long distance carrier service for MS 17, as previously selected by the subscriber. The information is sent back to LEC 1 via paths 25, 26.

Now that LEC 1 has the roaming telephone number for MS 17 and the specified long distance carrier, it initiates a call via the long distance carrier trunk terminals 7 and 8 using the roaming telephone number paths 27, 28 and 29. When Washington LEC 14 receives this telephone number, it recognizes it as one of the numbers assigned to SC 11, and sends the call to SC 11 via path 30, which in turn sends the call to MS 17 via path 31. Had roaming telephone numbers from other assigned blocks of numbers been received by LEC 14, the call would have been directed to the appropriate one of the other wireless service carriers SC 9-10 and 12-13 as indicated by the additional paths 31, 32, 33 and 34 leaving LEC 14.

In a preferred embodiment of the present invention, as shown in FIGS. 3 and 4, additional communication links may be established directly between each of the long distance terminals 7 and 8 and the respective wireless service carriers 2-6 and 9-13 as indicated by the broken lines 18, 18', 19 and 19'. More importantly, a Wireless Carrier Identification Code (WCIC) is included with the information propagated in either direction along the long distance trunk 35, so that LD 7 or 8 can decide which wireless service carrier will receive the telephone call. Because of the additional WCIC parameter, which determines the routing a call will receive after the long distance trunk, it is possible for multiple wireless service carriers to use identical roaming telephone numbers. In other words, the WCIC will prevent ambiguity in these telephone numbers and ensure that the call is properly delivered to the appropriate wireless service carrier for connection to the roaming subscribers which it is currently servicing.

In more detail with reference to FIGS. 3 and 4, an originating subscriber 16 dials the LEC 1, which sends the desired telephone number to SC 4 and subsequently to HLR 15 using paths 40 and 41. Using paths 43 and 44, HLR 15 queries the VLR associated with SC 11 in the case where the roaming telephone numbers are temporarily assigned to the roaming subscribers only during each telephone call. Otherwise, HLR 15 already has MS 17's temporary roaming number because it was transmitted when MS 17 first registered with SC 11.

The HLR 15 then sends the roaming number, along with the CIC and a new parameter, the WCIC, back to SC 4 via path 45. Because of the additional communication link 18 between SC 4 and LD 7, SC 4 may continue the call by sending it directly to the long distance trunk via path 47 without first passing through LEC 1. Alternatively, the call may first pass through LEC 1 and its trunk link 27 using the conventional system links, which avoids the cost of new communication links 18 and 18'. In this case, SC 4 forwards the CIC and the WCIC to LEC 1 via path 46. In either case, along with the conventional information propagated along path 48 of the long distance trunk, such as the roaming telephone number, the new parameter WCIC is also sent to indicate which wireless service carrier should receive the call at the other (remote) end of the long distance trunk.

Similarly, when LD 8 receives the call, it may send the call directly to SC 11 over the new communication link 19, therefore bypassing LEC 14. Alternatively, the call may be routed by its WCIC through LEC 14 using conventional communication links, which may be desirable where the cost of new communication links 19 and 19' is to be avoided. Once at SC 11, the roaming telephone number is used to establish a wireless connection with MS 17.

It follows that the additional WCIC parameter enables multiple uses of the same roaming telephone numbers between the plural wireless service carriers 9–13 and with the wired subscribers of LEC 14. The WCIC essentially provides a flag which enables virtually any telephone number to be used during a telephone call throughout the telecommunication system. When the WCIC is present, the telephone number will be properly understood and sent to the appropriate wireless service carrier. If no WCIC is received, then the call will proceed as normal through the LEC 14 to the appropriate wired subscriber (or the appropriate wireless service carrier using the prior methods).

While the routing of the call directly from LD 8 to SC 11 enables a faster routing than the conventional system wherein the call must first pass through LEC 14, it should be clear that the invention comprising the WCIC will also work if the call is sent first to the LEC 14 and then to SC 11. In this case, the decision of which wireless service carrier should receive the call is made by LEC 14 rather than LD 8. Thus, new links 18 and 19 are not essential to the operation of the present invention.

In summary, by utilizing the WCIC parameter to properly route calls to the appropriate wireless service carrier, it is possible to avoid the wasteful allocation of different blocks of generally inactive telephone numbers to each of the multiple wireless service carriers, as currently needed for assignment to the rapidly increasing number of roaming subscribers. The WCIC enables multiple use of the same telephone numbers among the wireless service carriers and the wired subscribers, thereby relieving the pressure on increasingly scarce telephone numbers. In addition, by adding the further links 18 and 19, the calls can be propagated faster through the telecommunication network than in conventional systems.

The WCIC parameter can also be expanded and utilized to identify different services provided by a single carrier, thus enabling the carrier to assign the same routing number to multiple subscribers where each subscriber uses a different service within the carrier's network. This can be performed by having a code point or sub-field within the WCIC parameter. Thus, in addition to a Carrier Identification Field, the WCIC parameter may include a Service Identification Field specifying, for example, a Cellular subscriber, a Paging subscriber, a Wireless Data subscriber, a Personal Communication Services subscriber, or an Information Services subscriber.

Although the present invention has been described in terms of a specific network topology, it should be clear to those skilled in the art that the invention is independent of a particular network topology or signalling method beyond that necessary to add a WCIC parameter to the conventional communication information and use this parameter to route the calls. Thus, the network may consist of only wireline carriers (i.e., a non-wireless environment) in which the WCIC is used to differentiate between different wired exchange carries in the same geographic region, such as where a single LD terminal point serves two or more LEC's.

The network also may comprise multiple long distance links through a variety of long distance carriers; the wireless service carriers may be linked to multiple HLR's and VLR's; and a variety of devices may be used by the wired and mobile subscribers 16 and 17, other than the telephones and handsets depicted in FIGS. 1–4, such as videophones, facsimile machines, computers, pagers and other terminal devices. In this regard, the WCIC parameter may be used to differentiate the corresponding routings.

It is also to be understood that references to different types of carriers (e.g., LD, LEC and SC) is not to be interpreted as requiring different corporate entities (as do current government regulations) for practice of the invention. Instead, the term "carrier" as used in this specification defines switching functionalities as follows: local wireline switching is equivalent to "Local Exchange Carrier", long distance switching is equivalent to "Interexchange Carrier" or "Long Distance Carrier", and wireless switching is equivalent to "Wireless Service Carrier". Thus, the indicated functionalities can be provided by a single nationwide carrier, or by multiple carriers of the same type within a single geographic region or within different geographic regions.

Furthermore, although the WCIC parameter is shown as added at HLR 15 to the information propagating along the network, it could equally be added at one of the intermediate carriers SC 4, LEC 1, LD 7–8, or LEC 14, provided that the subscriber's original telephone number or some related parameter is also propagated along the network so that the corresponding one of these network resources may initiate messaging with HLR 15 or an appropriate VLR to determine the identity of the wireless service carrier serving MS 17. Also, the local terminal point 7 and the remote terminal point 8 may be provided by the same or different long distance (LD) carriers, and in the latter case, the WCIC parameter may be added at either LD carrier.

For the case where each roaming subscriber must communicate with a sole designated wireless service carrier in each geographic area, it is also possible that the subscriber's original telephone number, or some related parameter which is normally sent along with the initial telephone call set up, may be arranged so that it originally contains a WCIC parameter designating the wireless service carrier. This would enable LEC 1, LD 7, LD 8 and LEC 14 to route the call by simply examining the originally dialed number, without requiring that an explicit additional WCIC parameter be added later. Thus, there are many variations of the preferred embodiments that are within the bounds of the present invention as defined by the appended claims.

What is claimed is:

1. A method of serving a roaming subscriber in a telecommunications system comprising a plurality of wireless service carriers that serve a first geographic area and that can each communicate with at least one corresponding roaming subscriber in said first geographic area, and a wired exchange carrier that can communicate with said wireless service carriers and having access to a trunk providing communication between a second geographic area and said first geographic area, said method comprising:

assigning a distinct call routing parameter to each of said wireless service carriers;

receiving at said wired exchange carrier via said trunk a call destined for one of said roaming subscribers, said call including a routing number corresponding to the roaming address of said one roaming subscriber and the call routing parameter corresponding to the wireless service carrier serving said one roaming subscriber;

sending the call from said wired exchange carrier selectively to said serving wireless service carrier in response to said call routing parameter; and, establishing a communication channel between said serving wireless service carrier and said one roaming subscriber in response to the said routing number, such that the same routing number is available for use by each of said wireless service carriers to route to its said corresponding subscriber a call selectively sent to it in response to its distinct call routing parameter.

2. The method according to claim 1 wherein said wired exchange carrier is a long distance carrier, and wherein said method further comprises establishing a communication link directly between said long distance carrier and said wireless service carrier.

3. The method of claim 1 wherein said long distance trunk is provided by a long distance carrier; wherein said wired exchange carrier is a local exchange carrier that can communicate with said long distance carrier and with said wireless service carrier; and wherein said method further comprises establishing a first communication link between said long distance carrier and said local exchange carrier, and a second communication link between said local exchange carrier and said wireless service carrier.

4. The method of claim 1 wherein said wired exchange carrier is a long distance carrier providing access to at least one of a local end and a remote end of said long distance trunk; wherein the wireless service carrier for communicating with said roaming subscriber is a remote wireless service carrier that can communicate with the remote end of said long distance trunk; wherein said telecommunications system further comprises a local wireless service carrier that can communicate with the local end of said long distance trunk, and a register that can communicate with said local and remote wireless service carriers; and wherein said method further comprises said remote wireless service carrier communicating its identity to said register, and said register communicating said identity to said local wireless service carrier.

5. The method of claim 4 wherein said call routing parameter is included in said call at said register.

6. The method of claim 4 wherein said call routing parameter is included in said call at said local wireless service carrier.

7. The method of claim 4 further comprising the step of establishing a communication link between said register and said long distance carrier, and wherein said call routing parameter is included in said call at said long distance carrier.

8. The method of claim 4 wherein said telecommunications system further comprises a local exchange carrier that can communicate with said local wireless service carrier and with said long distance carrier, wherein said method further comprises establishing a communication link between said register and said local exchange carrier, and wherein said call routing parameter is included in said call at said local exchange carrier.

9. A method of serving a roaming subscriber in a telecommunications system comprising a plurality of wireless service carriers that serve a first geographic area and that can each communicate with at least one corresponding roaming subscriber in said first geographic area, and a wired exchange carrier that can communicate with said wireless service carriers and having access to a trunk providing communication between a second geographic area and said first geographic area, said method comprising:

assigning a distinct call routing parameter to each of said wireless service carriers;

establishing a communication link between said trunk and the wireless service carrier serving one of said roaming subscribers;

receiving at said wired exchange carrier via said trunk a call destined for said one roaming subscriber, said call including a routing number corresponding to the roaming address of said one roaming subscriber and the call routing parameter corresponding to said serving wireless service carrier;

sending the call from said wired exchange carrier selectively to said serving wireless service carrier, said call being sent over said communication link between said trunk and said serving wireless service carrier in response to said call routing parameter; and, establishing a communication channel between said serving wireless service carrier and said one roaming subscriber in response to said routing number, such that the same routing number is available for use by each of said wireless service carriers to route to its said corresponding subscriber a call selectively sent to it in response to its distinct call routing parameter.

10. The method according to claim 9 wherein said wired exchange carrier is a long distance carrier, and wherein said method further comprises establishing a communication link directly between said long distance carrier and said wireless service carrier.

11. The method of claim 9 wherein said long distance trunk is provided by a long distance carrier; wherein said wired exchange carrier is a local exchange carrier that can communicate with said long distance carrier and with said wireless service carrier; and wherein said method further comprises establishing a first communication link between said long distance carrier and said local exchange carrier, and a second communication link between said local exchange carrier and said wireless service carrier.

12. The method of claim 9 wherein said wired exchange carrier is a long distance carrier providing access to at least one of a local end and a remote end of said long distance trunk; wherein the wireless service carrier for communicating with said roaming subscriber is a remote wireless service carrier that can communicate with the remote end of said long distance trunk; wherein said telecommunications system further comprises a local wireless service carrier that can communicate with the local end of said long distance trunk, and a register that can communicate with said local and remote wireless service carriers; and wherein said method further comprises said remote wireless service carrier communicating its identity to said register, and said register communicating said identity to said local wireless service carrier.

13. The method of claim 12 wherein said call routing parameter is included in said call at said register.

14. The method of claim 12 wherein said call routing parameter is included in said call at said local wireless service carrier.

15. The method of claim 12 further comprising establishing a communication link between said register and said long distance carrier, and wherein said call routing parameter is included in said call at said long distance carrier.

16. The method of claim 12 wherein said telecommunications system further comprises a local exchange carrier that can communicate with said local wireless service carrier and with said long distance carrier, wherein said method further comprises the step of establishing a communication link between said register and said local exchange carrier, and wherein said call routing parameter is included in said call at said local exchange carrier.

17. The method according to claim 9 wherein said wireless service carrier provides different services to different subscribers; and wherein said call routing parameter comprises a carrier identification field identifying said wireless service carrier, and a service identification field identifying a particular one of said different subscribers in accordance with the service provided to said particular subscriber by said wireless service carrier.

18. The method according to claim 17 wherein the service provided to said particular subscriber is selected from the group consisting of a cellular service, a paging service, a wireless data service, a personal communication sevice and an information service.

19. A method of serving a subscriber in a telecommunications system comprising a plurality of service carriers that serve a first geographic area and that can each communicate with at least one corresponding subscriber in said first geographic area, and an exchange carrier that can communicate with said service carriers and having access to a trunk providing communication between a second geographic area and said first geographic area, said method comprising:

assigning a distinct call routing parameter to each of said wireless service carriers;

receiving at said exchange carrier via said trunk a call destined for one of said subscribers, said call including a routing number corresponding to the address of said one subscriber and the call routing parameter corresponding to the service carrier serving said one subscriber;

sending the call from said exchange carrier selectively to said serving service carrier in response to said call routing parameter; and, establishing a communication channel between said serving service carrier and said one subscriber in response to the said routing number, such that the same routing number is available for use by each of said service carriers to route to its said corresponding subscriber a call selectively sent to it in response to its distinct call routing parameter.

\* \* \* \* \*